United States Patent
Patwardhan et al.

(10) Patent No.: US 11,706,710 B2
(45) Date of Patent: Jul. 18, 2023

(54) OPTIMIZING SERVICE PERIOD NEGOTIATIONS IN WLAN NETWORKS

(71) Applicant: HEWLETT PACKARD ENTERPRISE DEVELOPMENT LP, Houston, TX (US)

(72) Inventors: Gaurav Patwardhan, Santa Clara, CA (US); Nitin A. Changlani, Santa Clara, CA (US); Eldad Perahia, Park City, UT (US); Sachin Ganu, Santa Clara, CA (US); Mohd Shahnawaz Siraj, Santa Clara, CA (US); Abhiruchi Dakshinkar, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 190 days.

(21) Appl. No.: 17/374,533

(22) Filed: Jul. 13, 2021

(65) Prior Publication Data

US 2023/0013861 A1     Jan. 19, 2023

(51) Int. Cl.
   *H04W 52/02*       (2009.01)
   *H04W 84/12*       (2009.01)

(52) U.S. Cl.
   CPC ........ *H04W 52/0216* (2013.01); *H04W 84/12* (2013.01)

(58) Field of Classification Search
   CPC .......................... H04W 52/0216; H04W 84/12
   See application file for complete search history.

(56) References Cited

U.S. PATENT DOCUMENTS

| | | | |
|---|---|---|---|
| 10,433,252 B2 | 10/2019 | Asterjadhi et al. | |
| 10,517,106 B1 | 12/2019 | Wang et al. | |
| 10,856,228 B1* | 12/2020 | Chu | H04W 52/0235 |
| 10,880,856 B2 | 12/2020 | Bhanage et al. | |
| 2016/0219522 A1* | 7/2016 | Asterjadhi | H04W 52/0235 |
| 2016/0381704 A1* | 12/2016 | Chu | H04W 52/0229 370/329 |
| 2017/0265130 A1* | 9/2017 | Kakani | H04W 48/10 |
| 2019/0268846 A1 | 8/2019 | Xiao et al. | |
| 2020/0059950 A1 | 2/2020 | Oteri et al. | |
| 2020/0359327 A1 | 11/2020 | Bhanage et al. | |

FOREIGN PATENT DOCUMENTS

WO     WO-2019004530     10/2019

OTHER PUBLICATIONS

Chen, Q. et. al., A Target Wake Time Scheduling Scheme for Uplink Multiuser Transmission in IEEE 802.11 ax-based Next Generation WLANs, (Research Report), IEEE Access, 2016, 17 pgs., vol. 4.

* cited by examiner

*Primary Examiner* — Mohammad S Anwar
(74) *Attorney, Agent, or Firm* — Sheppard Mullin Richter & Hampton LLP

(57) ABSTRACT

Systems and methods are configured to receive a first request to schedule a Time To Wake (TWT) service period (SP) for a first station. The first request can be based on individual TWT protocol. That the TWT SP satisfies a threshold level of similarity with an existing TWT SP maintained for a group of at least one station scheduled to communicate over the existing TWT SP can be determined. The group can include a second station. The first station can be assigned to the group. A first packet can be transmitted to the first station and a second packet can be transmitted to the second station over the existing TWT SP.

20 Claims, 9 Drawing Sheets

OPTIMIZING SERVICE PERIOD NEGOTIATIONS IN WLAN NETWORKS

DESCRIPTION OF RELATED ART

Today, wireless devices are ubiquitous. From printers and smart TVs to Internet of Things (IoT) devices such as smart bulbs, personal assistants, wireless speakers, smart thermostats, etc., many devices vie for connection to wireless networks. Some of these devices operate on batteries with limited stored energy. Latest generation of Wi-Fi standards have introduced a range of technologies that can reduce power consumption to address challenges associated with operating devices with limited stored energy. One such technology is Target Wake Time (TWT). TWT can enable access points (APs) and devices to negotiate and define specific times for the devices to wake up from their power save modes and access a communication medium. Thus, TWT can significantly increase device sleep time, thereby reducing power consumption.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

IEEE 802.11ax defines the Target Wake Time (TWT) mechanism between an AP and connected devices, also referred to as stations (STAs). TWT enables STAs to determine when, and how frequently, they will wake up or send or receive data. Using TWT, devices can negotiate specific service periods (e.g., also referred as TWT service periods or Wake Durations) during which STAs can wake up from a power save mode and communicate with an AP. When outside of the service periods, STAs can be put in the power save mode to reduce power consumption or perform off-channel operations. In addition to the reduced power consumption, the negotiated service periods can allow an AP to manage STA activities by scheduling STAs to operate at different times and, therefore, minimize contention between the STAs.

TWT offers two broad categories of agreements: (i) individual TWT and (ii) broadcast TWT. Under (i) individual TWT, a service period can be negotiated on per-station basis and each STA can set its own next service period. Under (ii) broadcast TWT, the AP 102 can set the next service periods for a group of STAs collectively by broadcasting TWT parameters to the group. Each STA can choose whether or not to subscribe to a schedule specified in the TWT parameters.

While the broadcast TWT offers its own set of benefits, it may not effectively account for all different types of STAs. For instance, some STAs may desire to negotiate the next service period that is hours or even days away. Perhaps because STAs may not always be able to conform to a schedule broadcasted by an AP, the broadcast TWT variant has not enjoyed wide support from STA manufacturers. On the other hand, the STA manufacturers readily recognize significant benefits TWT offers and have shown interest in implementing individual TWT.

The individual TWT variant is not without its own set of shortcomings. For one, the individual TWT incurs overheads of negotiating a service period for each STA and, further, maintaining the negotiated service period for the STA. Establishing a TWT session for every STA may lead to undesirable signaling overheads. Conventional approaches do not provide efficient mechanism to reduce the overhead associated with Individual TWT.

An improved approach rooted in computer technology can reduce overheads for an AP in negotiating and maintaining individual service periods for STAs by grouping the service periods into one or more sets that can be operated in a similar fashion to the broadcast TWT. Present technology can arrange negotiated service periods of STAs such that a service period can overlap with another service period, thereby enabling an AP to maintain a collective state for a subset of stations that share similarly negotiated service periods. The present technology is described in further details below.

Figure 1:
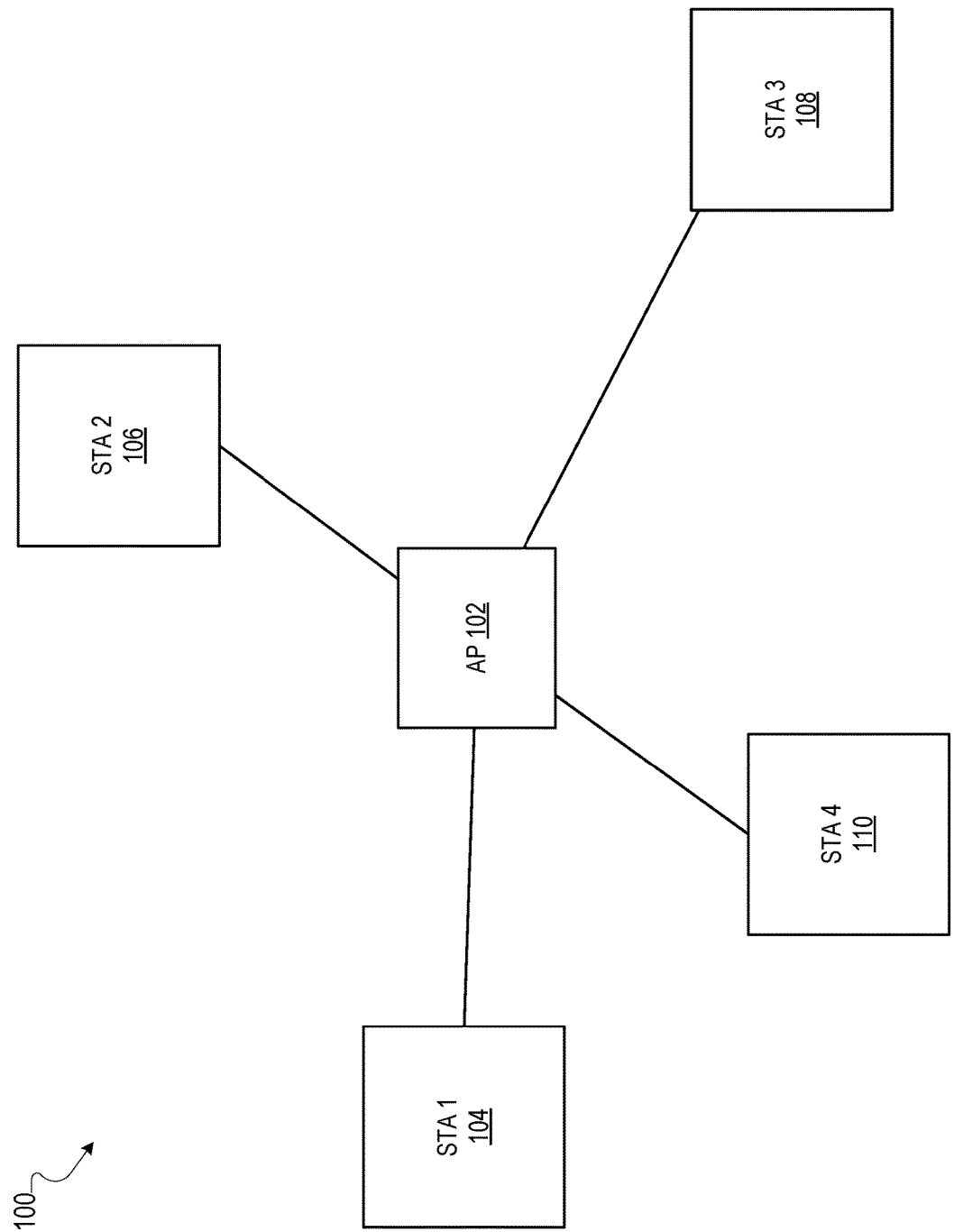
FIG. 1 illustrates an example wireless network deployment in which optimized service period negotiations can be implemented in accordance with various embodiments.

FIG. 1 illustrates an example wireless network deployment 100 in which optimized Service period negotiations can be implemented in accordance with various embodiments. The example wireless network deployment 100 includes an AP 102 connected to multiple STAs (e.g., STA 1, STA 2, STA 3, and STA 4, respectively numbered 104, 106, 108, 110). The AP 102 can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. Moreover, as used herein, the AP 102 may refer to receiving points for any known or convenient wireless access technology which may later become known and is not intended to be limited to IEEE 802.11-based APs. The STAs 104, 106, 108, 110 can be any device that is capable of connecting to the AP 102 and negotiate a Service period with the AP 102.

Figure 2:
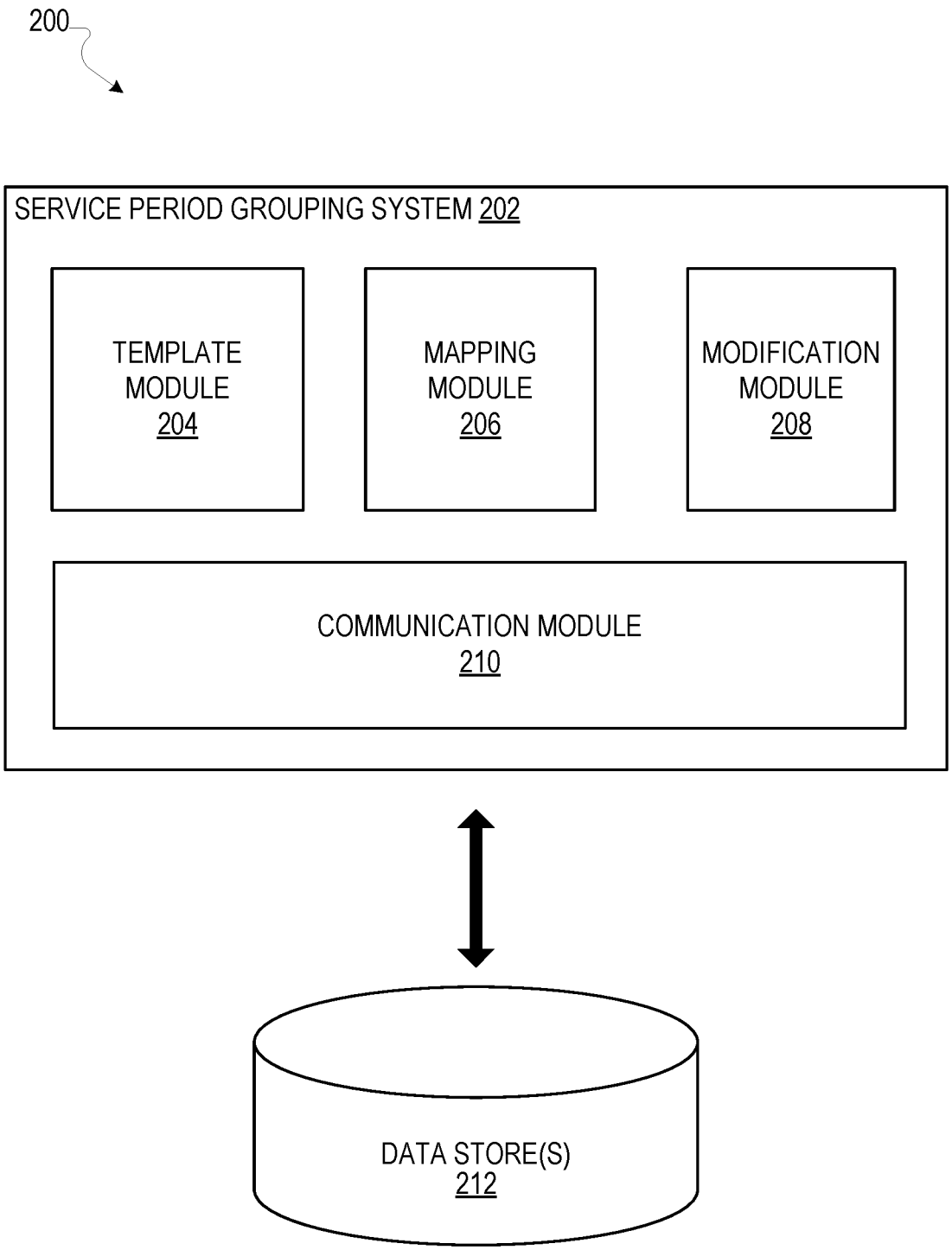
FIG. 2 illustrates a block diagram of an example service period grouping system in which optimized service period negotiations can be implemented in accordance with various embodiments.

FIG. 2 illustrates a block diagram 200 of an example service period grouping system 202 in which optimized service period negotiations can be implemented in accordance with various embodiments. The service period grouping system 202 can be an AP (e.g., the AP 102 of FIG. 1) or implemented as a part of the AP. The service period grouping system 202 can include a template module 204, a mapping module 206, a modification module 208, and a communication module 210. The service period grouping system 202 can provide various functions relating to grouping service periods of STAs (e.g., the STAs 104, 106, 108, 110 of FIG. 1) into one or more sets. The modules in this figure and all figures herein are exemplary only, and other implementations may include additional, fewer, integrated or different components. Some modules may not be shown so as not to obscure relevant details.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a network computing device or on a server. For example, one or more modules and/or applications described herein, or at least a portion thereof, can be implemented as or within an application (e.g., app), a program, or an applet, etc., running on network computing device or system. The network computing device or system can be one or more hubs, repeaters, bridges, switches, routers, gateways, or the like. In another example, one or more modules and/or applications, or at least a portion thereof, can be implemented using one or more computing devices or systems that include one or more servers, such as network servers or cloud servers. It should be understood that there can be many variations or other possibilities.

The template module 204 can be configured to generate and maintain predefined template service periods to which to group (e.g., map, assign, or subscribe) STAs. For instance, the template module 204 can generate template service periods for different periodicity and/or duration and maintained. More details regarding the template service periods are provided with FIGS. 5A-5C.

The mapping module 206 can be configured to find a matching template service period and map (e.g., subscribe or assign) a STA to the template service period. The matching template service period can be a template service period generated and maintained by the template module 204. In some embodiments, when there does not exist a matching template service period, the mapping module 206 can instruct the template module 204 to generate a new template service period and, then, map a STA to the new template service period.

The matching of a template service period to a requested service period of a STA may not be exact (e.g., an exact match of a periodicity and/or duration) and, instead, be based on a degree of similarity between the template service period to the requested service period. For instance, a threshold level of similarity can be determined based on differences in parameters associated with the template service period and the requested service period. The differences in parameters can be represented in absolute terms (e.g., within a threshold milliseconds) or in relative terms (e.g., percent difference over a proportional threshold). When it is determined that there exists a template service period that satisfies the threshold level of similarity, the mapping module 206 can map a STA that requested a matching service period to the template service period. The mapping module 206 can confirm a negotiated service period to the STA by sending an acceptance packet (e.g., a data packet). More details regarding negotiation scheme are provided with FIGS. 3A-3B.

In some embodiments, the mapping module 206 can map a STA based on statistics relating to a particular template service period. The statistics can include how many STAs are mapped (e.g., assigned) to the particular template service period and/or how much network communication occurs over a service period specified by the particular template service period. For instance, the service period grouping system 202 can monitor the service period specified particular template service period for network communication activities with STAs already assigned to the particular template service period. If, for example, over 90% of the service period is filled with data frames/packets, the mapping module 206 may deny mapping of a STA that requests the service period and instead suggest the STA to request a different service period. Other types of statistics relating to a template service period and threshold values other than 90% above may be used to map (or deny mapping) the STA.

In some embodiments, the mapping module 206 can un-map (e.g., release or unassign) a STA based on monitored activity of the STA during a negotiated service period (e.g., a mapped template service period). For instance, if it is determined that the STA is no longer connected or active, then the mapping module 206 can un-map the STA so that another STA may be mapped to the template service period.

In some embodiments, the mapping module 206 can take into account a communication capability of a STA to determine a template to subscribe the STA. For instance, 802.11ax introduced an High Efficiency (HE) STA which can only operate in 20 MHz when associated to a Basic Service Set (BSS) which operates at the same or larger bandwidth (e.g., 20/40/80/160 MHz). Whether the STA can only operate in 20 MHz can be signaled via HE capabilities information element. For such STA, operation in primary 20 MHz is mandatory and secondary 20 MHz is optional. This type of STA (20 MHz-only STA) has been introduced to address device form factors where power savings are critical such as, for instance, IoT capable devices.

When two or more 20 MHz-only STAs associated to a BSS can operate only in the primary channel, they may only support a restricted/limited number of Resource Unit (RU) combinations when grouped in a high efficiency multi-user physical protocol data unit (HE MU PPDU). To prevent limiting a communication channel to the restricted/limited number of RU combinations, 20 MHz-only STAs may be subscribed to separate service periods. The separate subscriptions can help the AP group other non-20 MHz-only STAs with 20 MHz-only STAs in uplink (UL) and downlink (DL) MU transmissions.

The service period grouping system 202 can optimize service period negotiations by reducing negotiation, maintenance, and communication overheads. Additionally, the service period grouping system 202 can optimize spectral efficiency by directing each STA to a template service period. More details regarding the mapping of STAs to template service periods are provided with FIGS. 5A-5C.

The modification module 208 can be configured to modify an existing template service period based on a service period request from a STA. In some instances, a service period requested by a STA may not exactly conform to a template service period an AP maintains or otherwise desires to provide. In those instances, as described, may deny the requested service period and suggest the STA to request a different service period. However, the different service period suggested by the AP may be incompatible for operation of the STA or the STA may keep insisting on the requested service period. When such a deadlock in negotiation occurs, the AP may modify (e.g., morph) at least one unsubscribed template service period or generate a new template service period and suggest the modified/new service period to the STA. The modified/new service period template may better overlap with the requested service period. Accordingly, an AP with the modification module 208 can be flexible in service period negotiations.

The communications module 210 can be configured to control network communications (e.g., transmitting and receiving of data packets) to and from a set of STAs based on a template service period mapped to the set of STAs. More specifically, the communication module 210 can, for a set of STAs sharing a common template service period, cause an AP to synchronize TWT and pre-emptively gain access to a communication medium for the set of STAs. In some embodiments, the communication module 210 may send synchronized trigger frames to the set of STAs. In some embodiments, STAs with different service period durations can be assigned to the same template service period having a particular periodicity (more details are provided with FIG. 5C) and aligned based on the respective negotiated service periods having the particular periodicity. In those instances, the communications module 210 can schedule network communications for STAs with shorter duration service periods before (e.g., earlier than) network communications for STAs with longer duration service periods. Thus, the communications module 210 can control timing and other aspects related to network communications by an AP for STAs.

As shown in FIG. 2, the service period grouping system 202 can be configured to communicate with a data store 212. The data store 212 can be configured to store and maintain various types of data to support the functionality of the service period grouping system 202. For example, the data store 212 can store and maintain template service periods and subscriptions of STAs (e.g., mapping of STAs) to the template service periods. Additionally, the data store 212 can store and maintain monitored network communication statistics pertaining to template service periods and each STA. Further, the data store 212 can store and maintain STA information including, but not limited to, device types, models, manufacturers, historical interactions, traffic types, etc. Accordingly, the data store 212 can support various functionalities of the template module 204, match module 206, modification module 208, and communication module 210.

It should be noted that the terms "optimize," "optimal" and the like as used herein can be used to mean making or achieving performance as effective or perfect as possible. However, as one of ordinary skill in the art will recognize, perfection cannot always be achieved. Accordingly, these terms can also encompass making or achieving performance as good or effective as possible or practical under the given circumstances, making or achieving performance better than that which can be achieved with other settings or parameters, or making or achieving performance within acceptable bounds with an optimized strategy. In the context of the present disclosure an optimal strategy can refer to a mapping between service periods and STAs that minimizes negotiation, maintenance, and/or communication overheads. However, other embodiments contemplated by the present technology can be optimized in accordance with one or more other and/or alternative metrics criteria and not limited to just the negotiation, maintenance, and/or communication overheads. For example, minimizing resource consumption (e.g., a size of memory footprint) or maximizing a number of serviced (e.g., subscribed) STAs may be other metrics or criteria upon which to perform optimization. The degree of optimization can also be varied in accordance with user needs/desires.

Figure 3A:
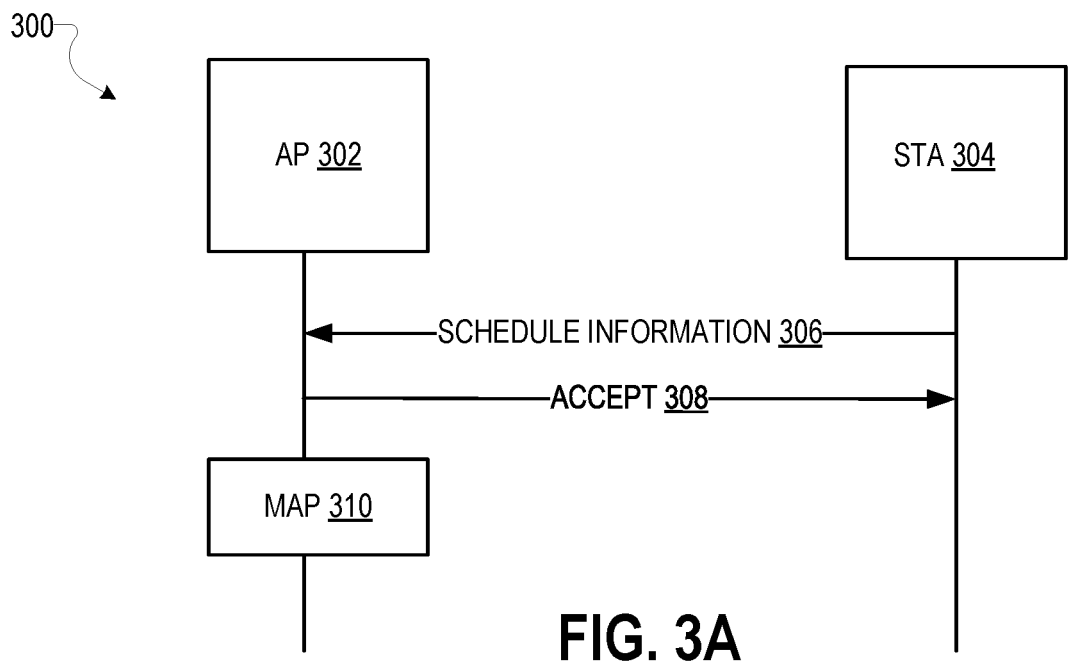
FIGS. 3A-3B illustrate example service period negotiation schemes in accordance with various embodiments.
Figure 3B:
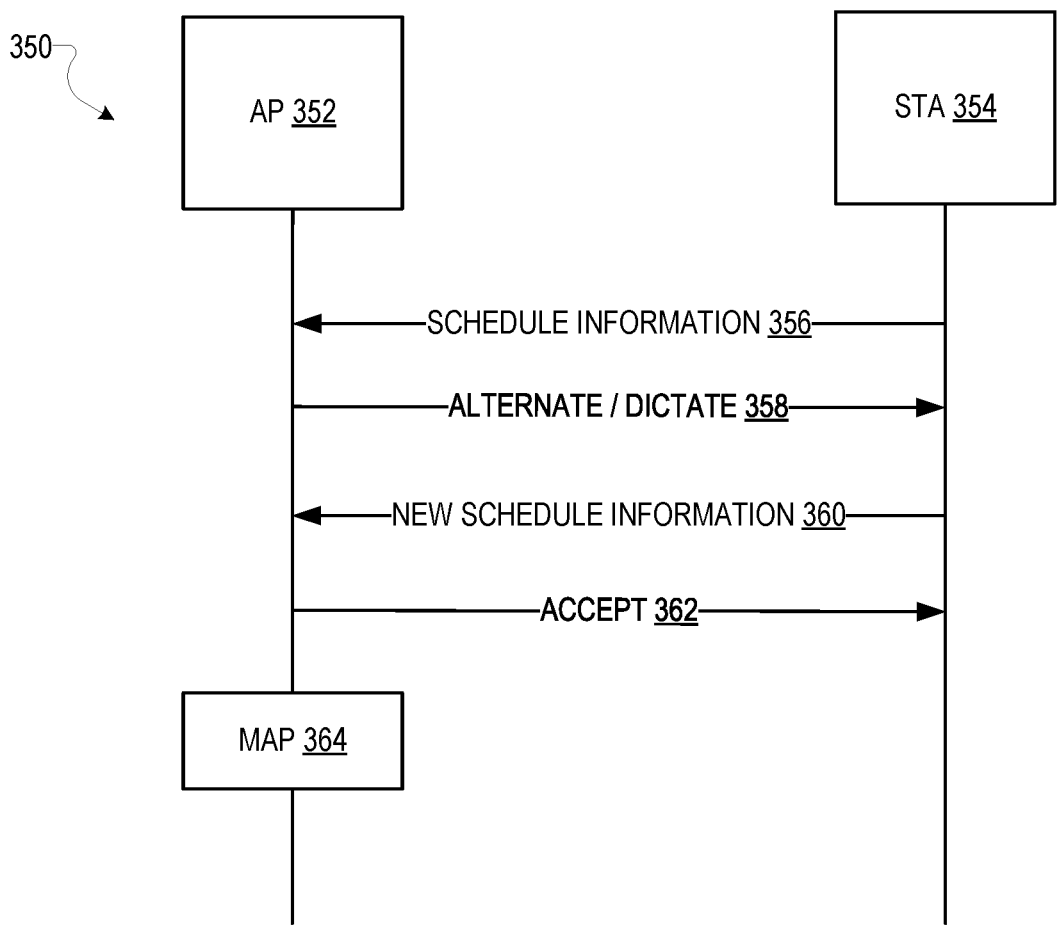

FIGS. 3A-3B illustrate example service period negotiation schemes 300, 350 in accordance with various embodiments. FIG. 3A illustrates a service period negotiation scheme 300 in which an AP 302 (e.g., the AP 102 of FIG. 1) accepts a requested service period from a STA 304 (e.g., the STA 104 of FIG. 1) without disagreements. The STA 304 can start an individual TWT session negotiation by sending a "Setup" message that can include TWT session parameters (e.g., periodicity, duration, etc.) that reflects a requested service period (e.g., schedule information 306). The TWT session parameters can be sent either in the form of a suggestion using a "Request" message or in the form of a strict requirement using a "Demand" message.

If the requested/demanded TWT session parameters can be strictly matched, or matched within a threshold level of similarity, with a template service period of the AP 302, the AP 302 can respond with an "Accept" message 308 to the STA 304. The AP 302 can map 310 the STA 304 to a matching service period and may, additionally, internally mark the STA 304 as subscribed to the template service period.

FIG. 3B illustrates a service period negotiation scheme 350 in which an AP 352 (e.g., the AP 102 of FIG. 1) receives a requested service period from a STA 354 (e.g., the STA 104 of FIG. 1) with disagreements. The STA 354 can, similar to the service period negotiation scheme 300 without disagreements, start an individual TWT session negotiation with TWT session parameters (e.g., schedule information 356).

If the requested/demanded TWT session parameters do not match with template service periods of the AP 352, the AP 352 can respond with an alternate agreement (e.g., alternate TWT session parameters) 358 based on the template service periods that overlap the most with the schedule information 356 of the STA 354. The alternate agreement 358 can be sent either as an "Alternate" message or in the form of a strict requirement using the "Dictate" message.

On receiving the alternate agreement 358 from the AP 352, the STA 354 can be required to send another Setup frame with the new/modified TWT session parameters (e.g., new schedule information 360) that match the suggested/dictated parameters by the AP 352. The AP 352 can respond with an "Accept" message 362 to the STA 354. The AP 352 can map 364 the STA 354 to a matching service period and may, additionally, internally mark the STA 354 as subscribed to the template service period.

In some instances, a deadlock in negotiation may occur. In such instances, as described, the AP 352 may modify/morph at least one unsubscribed template service period into modified/new service period templates to provide to the STA 354 and resolve the deadlock.

Figure 4:
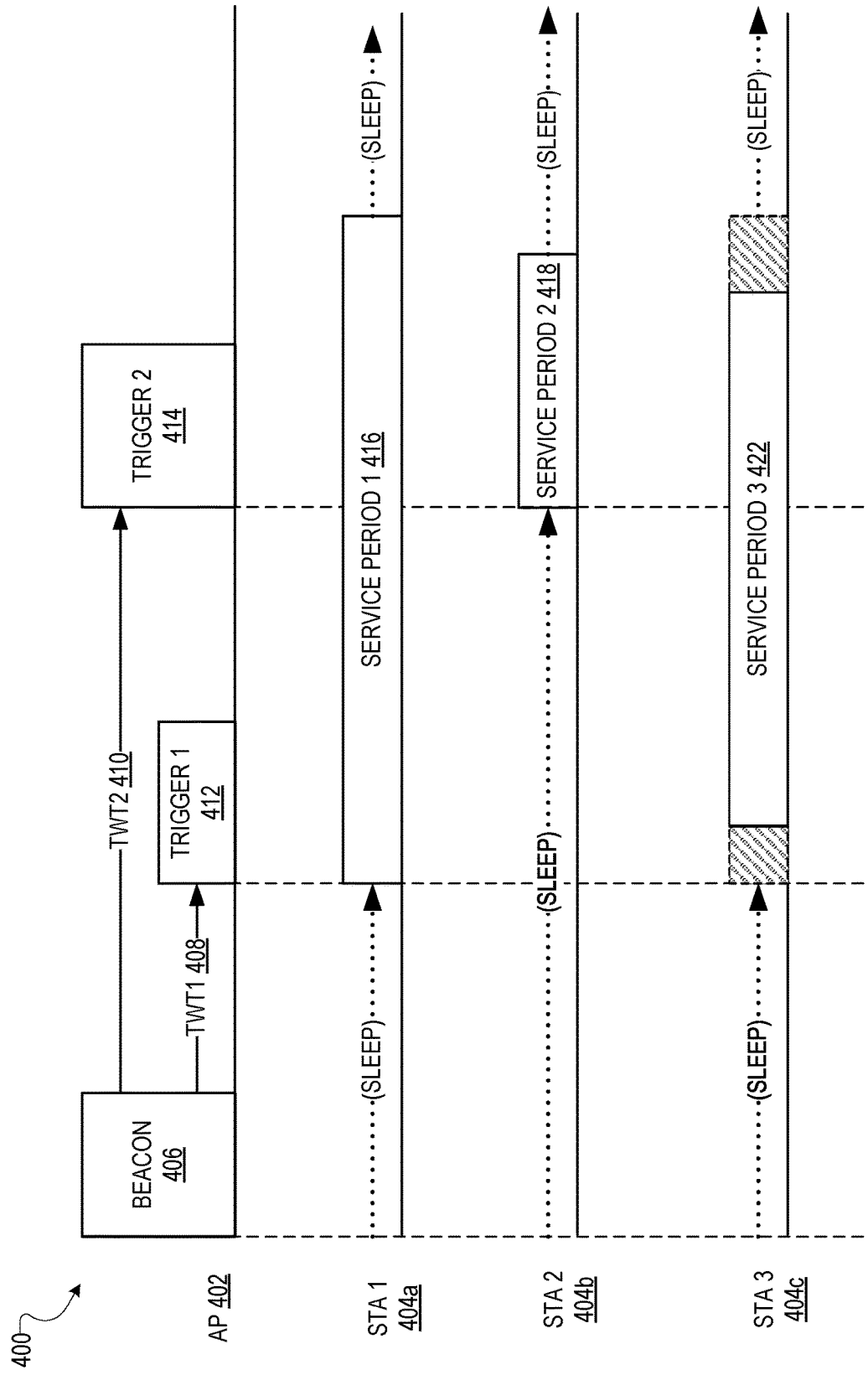
FIG. 4 is an example representation of negotiated service periods in accordance with various embodiment.

FIG. 4 is an example representation 400 of negotiated service periods in accordance with various embodiment. The example representation 400 illustrates an AP 402 (e.g., the AP 102 of FIG. 1) and three STAs 404a, 404b, 404c. The AP 402 can provide a beacon frame 406. A beacon frame 406 is one of the management frames in IEEE 802.11 wireless LAN standards that can contain information about a communication medium (e.g., wireless network). Beacon frames can be transmitted periodically to announce the presence of a wireless LAN and to synchronize some operational aspects of STAs 404a, 404b, 404c.

The STAs 404a, 404b, 404c can negotiate own service periods based on service period negotiation schemes (e.g., the example service period negotiation schemes 300, 350 of FIG. 3A-3B). A first STA (e.g., STA 1) 404a can negotiate a first service period (e.g., service period 1) 416 with the AP 402. The first service period 416 has a first TWT (e.g., TWT 1) 408 that can be synchronized with a first trigger frame (e.g., trigger 1) 412. Similarly, a second STA (e.g., STA 2) can negotiate a second service period (e.g., service period 2) 418 with the AP 402. The second service period 418 has a second TWT (e.g., TWT 2) 410, different from the first TWT, that can be synchronized with a second trigger frames (e.g., trigger 2) 414. In the example representation 400, the first service period for the first STA 404a and the second service period for the second STA 404b can be negotiated in accordance with the example service period negotiation scheme 300 of FIG. 3A.

A third STA (e.g., STA 3) 404c can negotiate a third service period (e.g., service period 3) 422 with the AP 402. The third STA 404c can request the third service period 422 when the AP 402 has the first service period 416 that matches the requested third service period 422. In some embodiments, the AP 402 may determine that the first service period 416 and the third service period 422 are similar enough that the third STA 404c can also be mapped to the first service period 416. Alternatively, as described above in relation to the example service period negotiation scheme 350 of FIG. 3B, the AP 402 may send an alternate agreement (e.g., "Alternate" or "Dictate" message 358 of FIG. 3B) to the third STA 404c. The alternate agreement may suggest the third STA 404c to, instead of the requested third service period 422, use the first service period 416 that may exist as a template service period already and mapped to the first STA 404a. If the third STA 404c agrees to the alternate agreement, then the AP 402 may synchronize network communications for the first STA 404a and the third STA 404c with the first trigger frame 412.

Figure 5A:
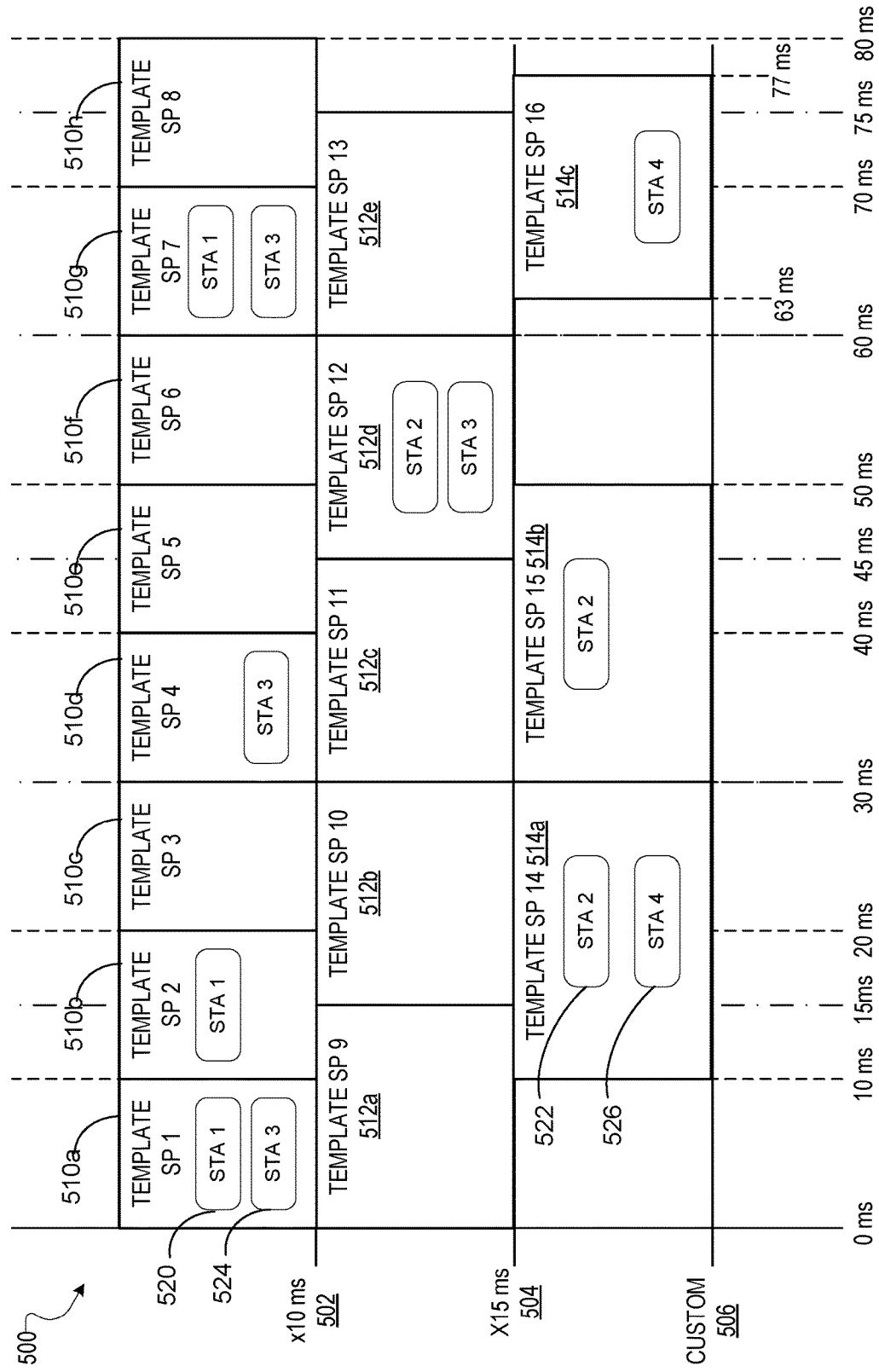
FIG. 5A illustrates an example template service period scheme that utilizes fully predefined template service periods in accordance with one embodiment.

FIG. 5A illustrates an example template service period scheme 500 that utilizes fully predefined template service periods in accordance with one embodiment. In the example template service period scheme 500, fully predefined template service periods (e.g., templates) can be generated, maintained, and managed by an AP (e.g., the AP 102 of FIG. 1). The fully predefined template service periods can be based on duration of time. For instance, a first set of templates 510a-510h are generated/defined based on 10 ms durations 502 and a second set of templates 512a-512e are generated/defined based on 15 ms durations 504. It should be noted that parameters associated with the templates 510a-510h, 512a-512e, 514a-514c (e.g., periodicities, durations, etc.) and the time scale are for exemplary purposes only and any different parameters can be used to generate/define predefined template service periods. In some embodiments, templates may not strictly adhere to multiplicative durations (e.g., 10 ms durations 502 and 15 ms durations 504). It is contemplated that templates can be customized to have any duration 506. For instance, a fourteenth template 514a and a fifteenth template each has a duration of 20 ms, a sixteenth template 514c has a duration of 14 ms.

The example template service period scheme 500 further illustrates multiple STAs (e.g., STA 1 520, STA 2 522, STA 3 524, and STA 4 526) that are subscribed to one or more templates 510a-510h, 512a-512e, 514a-514c based on agreed upon TWT parameters. In the subscriptions, subscription to the templates 510a-510h, 512a-512e, 514a-514c may or may not be the same across the STAs. For example, STA 1 520 may be subscribed to a first template 510a, a second template 510b, and a seventh template 510g and STA 3 524 may be subscribed to the first template 510a, a fourth template 510d, and the seventh template 510g. As illustrated, when a STA (e.g., the STA 1 520) requests a service period that is longer than a service period provided by one template (e.g., 510a), the STA can be subscribed to multiple consecutive (e.g., the first and second templates 510a, 510b) service periods as reflected in templates to provide a longer service period. In some instances, a STA (e.g., the STA 3 524) can be subscribed to overlapping service periods (e.g., the fifteenth and twelfth templates 514b, 512d).

The example template service period scheme 500 illustrates a time frame that falls within one beacon frame (e.g., typically 100 ms), but additional beacon frames can be provided in the future. In some embodiments, periodicity of the overlap may not be the same across different STAs. For instance, the STA 1 520 may communicate over its service periods reflected by subscribed templates 510a, 510b, 510g every beacon interval but the STA 3 524 may communicate over its service periods reflected by subscribed templates 510a, 510d, 510g every 10 beacon intervals. Accordingly, the AP can further specify, maintain, and map to different periodicity for different STAs.

Figure 5B:
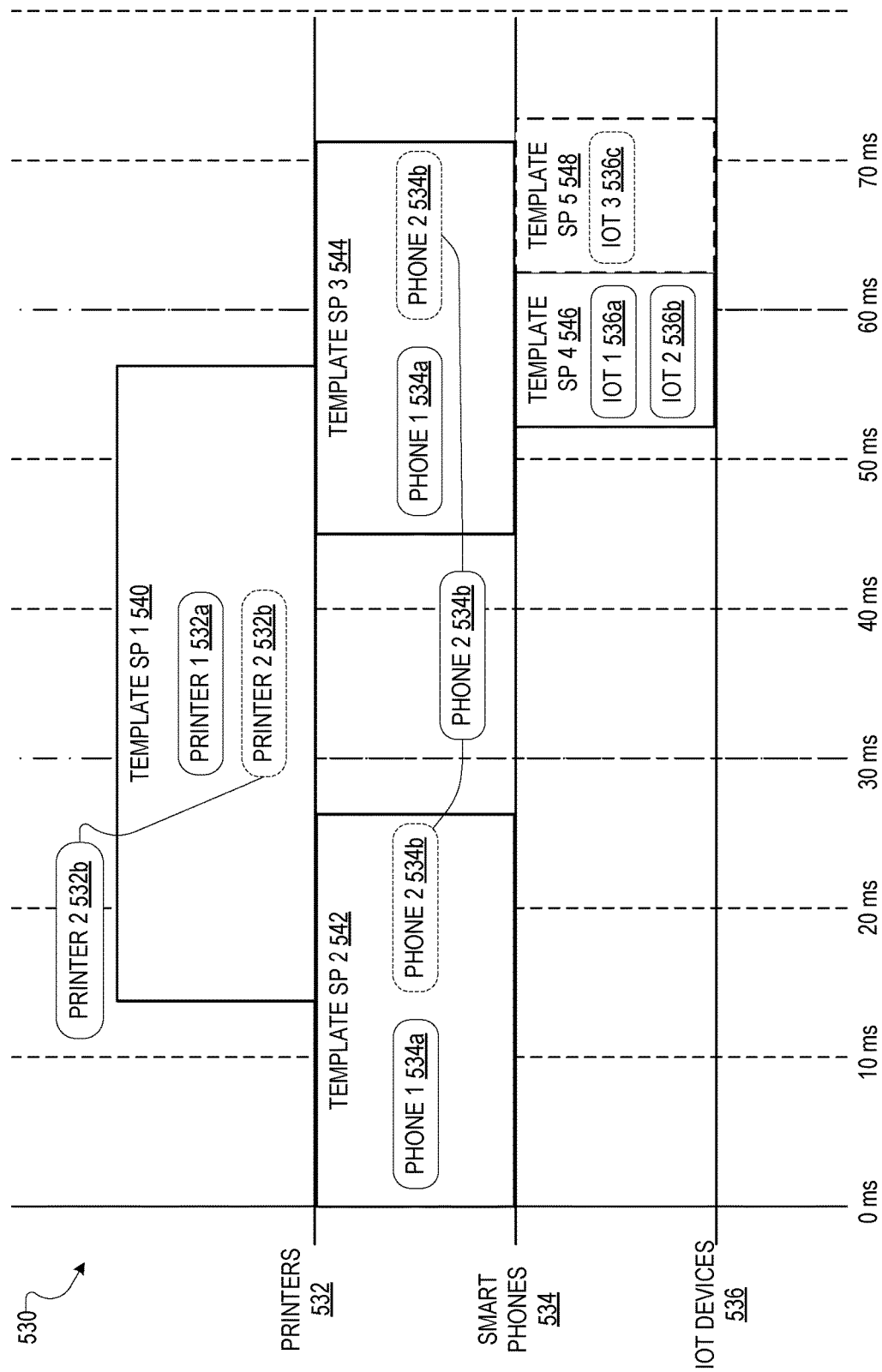
FIG. 5B illustrates an example template service period scheme that utilizes dynamically created template service periods in accordance with one embodiment.

FIG. 5B illustrates an example template service period scheme 530 that utilizes dynamically created template service periods in accordance with one embodiment. The example template service period scheme 530 does not rely on predefined template service periods but an AP (e.g., the AP 102 of FIG. 1) can generate a new template service period based on requested service periods from STAs (e.g., the STA 104, 106, 108, 110 of FIG. 1).

The AP can first determine whether there exists a template service period that matches, or substantially matches based on a threshold level of similarity, a requested service period of a STA. If there does not exist a template service period that satisfies matching criteria, then the new template service period can be generated and the STA can be subscribed to the new template service period. Otherwise, the STA can be subscribed to a matching template service period. For example, a first template service period 540 can be generated based on a requested service period from a first printer 532a upon a determination that there does not exist a matching template service period. The first printer 532a can be subscribed to the newly generated first template service period 540.

Subsequent to the generation and subscription of the first printer 532a, a second printer 532b may request a service period that is the same, or substantially the same, as the service period of the first template service period 540. The second printer 532b can be assigned to the first template service period 540. The approach of the example template service period scheme 530 can provide multiple benefits including better management of template service periods through reduced number of template service periods by fully utilizing different device types, models, manufacturers, historical interactions, traffic types, etc.

The present application observes that STA vendors have certain predefined/preferred TWT parameters for each STA that the STA requests. Further, based on practical implementation and cost/benefit concerns, most APs deployed do not readily service the entire range of available device types and traffic types. Thus, an AP may see about 5-10 types of devices which can reduce the range of possible TWT parameters even further. Thus, the predefined/preferred TWT parameters can reduce a number of possible likely combinations of TWT parameters to use for generating template service periods and grouping STAs into the template service periods.

The grouping STAs based on their predefined/preferred TWT parameters can be especially effective in use cases where a device type is closely related to a traffic type. For instance, the first printer 532a and the second printer 532b may request or exhibit similar traffic. Similarly, each device type of security cameras, IoT devices, etc. can be associated similar traffic. Additionally, an AP may monitor application type (e.g., game application, SNS application, etc.) to determine which template service periods should be suggested to an STA as well. Device type, traffic type, application type, or any other types of parameters can be used to determine a suitable template service period to map/suggest to an STA.

In some embodiments, a template service period can be tagged with any combination of a device type, traffic type, application type, or any other parameters associated with a STA. For example, the first template service period 540 can be tagged with "printers" 532, a second and third template service periods 542, 544 can be tagged with "smart phones" 534, and a third template service period 546 can be tagged with "IoT devices". Further, a STA or a TWT session thereof can be tagged with such one or more tags. One or more STAs can be grouped into the same template service period based on having the same tags. For instance, a second smart phone 534b can be grouped into the second and third template service periods 542, 544 based on having the same tag as a first smart phone 534a.

In some embodiments, a new template service period can be dynamically generated based on a determination that an existing template service period should not be subscribed by a new STA. For instance, each template service period can be monitored to determine how populated/filled the template service period is with network communications to and from the STAs. For instance, a template service period can be filled with data packets to or from the STAs over a threshold level (e.g., a percentage threshold of, say, 90%). If the threshold level is satisfied, then a new template service period can be generated and suggested to the new STA. As an example, a fourth template service 546 may be filled over 90% with data packets to and from first and second IOT devices 536a, 536b. In response, when a third IoT device 536c requests (i) the same service period as the template service period 546 and/or (ii) the third IoT device 536c has the same tag (e.g., parameters) as the first and second IoT devices 536a, 536b, the third IoT device 536c can nevertheless be subscribed to a fifth template service period 548 that can be newly generated.

The AP can manage which and how many STAs are subscribed to its dynamically generated template service periods. When a STA unsubscribes from a fully subscribed template service period, the AP can open up the template service period to potentially subscribe another STA. When all STAs unsubscribe from a template service period, the AP can remove the template service period altogether. Additionally, the AP can also add the template to the list of existing templates if the template did not already exist in the list of templates.

Figure 5C:
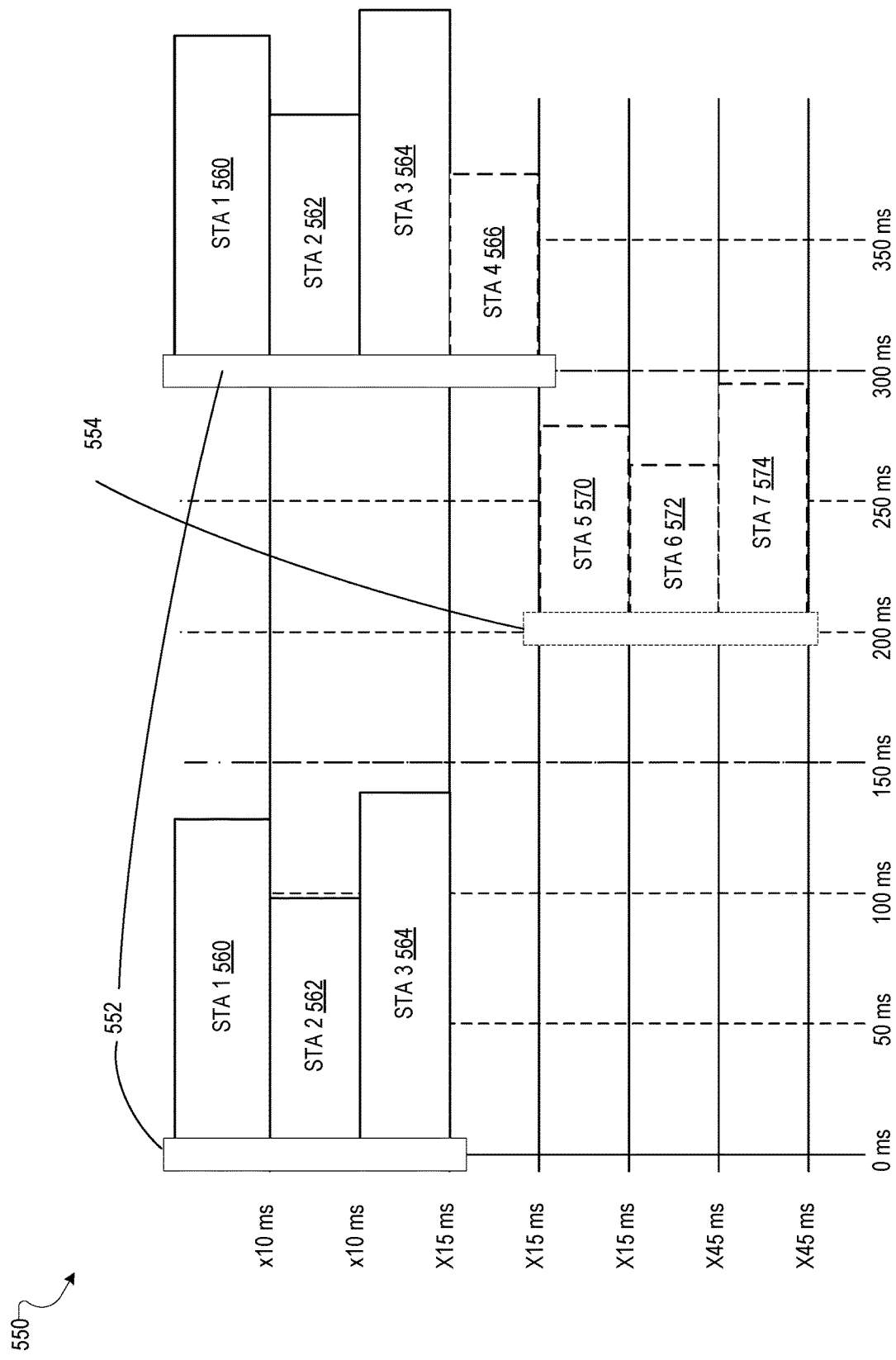
FIG. 5C illustrates an example template service period scheme with a hybrid approach in accordance with one embodiment.

FIG. 5C illustrates an example service period scheme 550 with a hybrid approach in accordance with one embodiment. The hybrid approach involves some parts that are predefined and some parts that are dynamically determined. For instance, an AP (e.g., the AP 102 of FIG. 1) can predefine templates based on one or more TWT parameters of service periods. One such TWT parameter is "TWT wake interval" parameter, which can define a periodicity (but not the duration of each service period) with which service periods are scheduled. As illustrated, a predefined template 552 has a periodicity (e.g., the "TWT wake interval" parameter) of 300 ms, which can be 3 beacon intervals (typically 100 ms). Other periodicities are also possible.

For the dynamic part, when a new STA (e.g., STA 4 566) requests a service period having a "TWT wake interval" of 300 ms, the "TWT wake interval" can be matched to an existing template (e.g., the predefined template 552) having the same or similar periodicity as a periodicity of the "TWT wake interval". For instance, it can be determined whether the "TWT Wake interval" satisfies a threshold similarity with a periodicity of the existing template. If there does not exist a match, a new template (e.g., a newly generated template 554) having a different "TWT wake interval" can be generated. STAs subscribed to each template can be aligned such that all of the start times of service periods of the STAs subscribed to each template can be the same. For example, STA1 560, STA 2 562, STA 3 564, and STA 4 566 can be subscribed to the predefined template 552 and have aligned start times for each period. As another example, STA 5 570, STA 6 572, STA 7 574 can be subscribed to the newly generated template 554 and have aligned start times for each period.

The alignment of the start times and subscription to templates can allow the AP to provide more predictable performance. For a template, the AP can protect the start of service periods by pre-emptively gaining access to a communication medium used for subscribed STAs. In some embodiments, STAs (e.g., STA 2 562) with shorter duration service periods can be scheduled earlier than STAs (e.g., STA 3 564) with longer duration service periods to provide sufficient time for the STAs with shorter duration service periods to complete its data communications while providing enough time for the STAs with longer duration service periods.

It is contemplated that any of the service period schemes 500, 530, 550 can be combined to provide a service period scheme that benefits from some aspects of the service period schemes 500, 530, 550. For instance, the service period scheme with fully defined templates 500 may have its template service periods already full from grouped STAs or an STA is requesting a service period which are not available with existing template service periods. In those instances, the service period scheme with dynamically created template service periods can be adopted to create a new template service period to which to map the STA. Other variations are possible.

Figure 6:
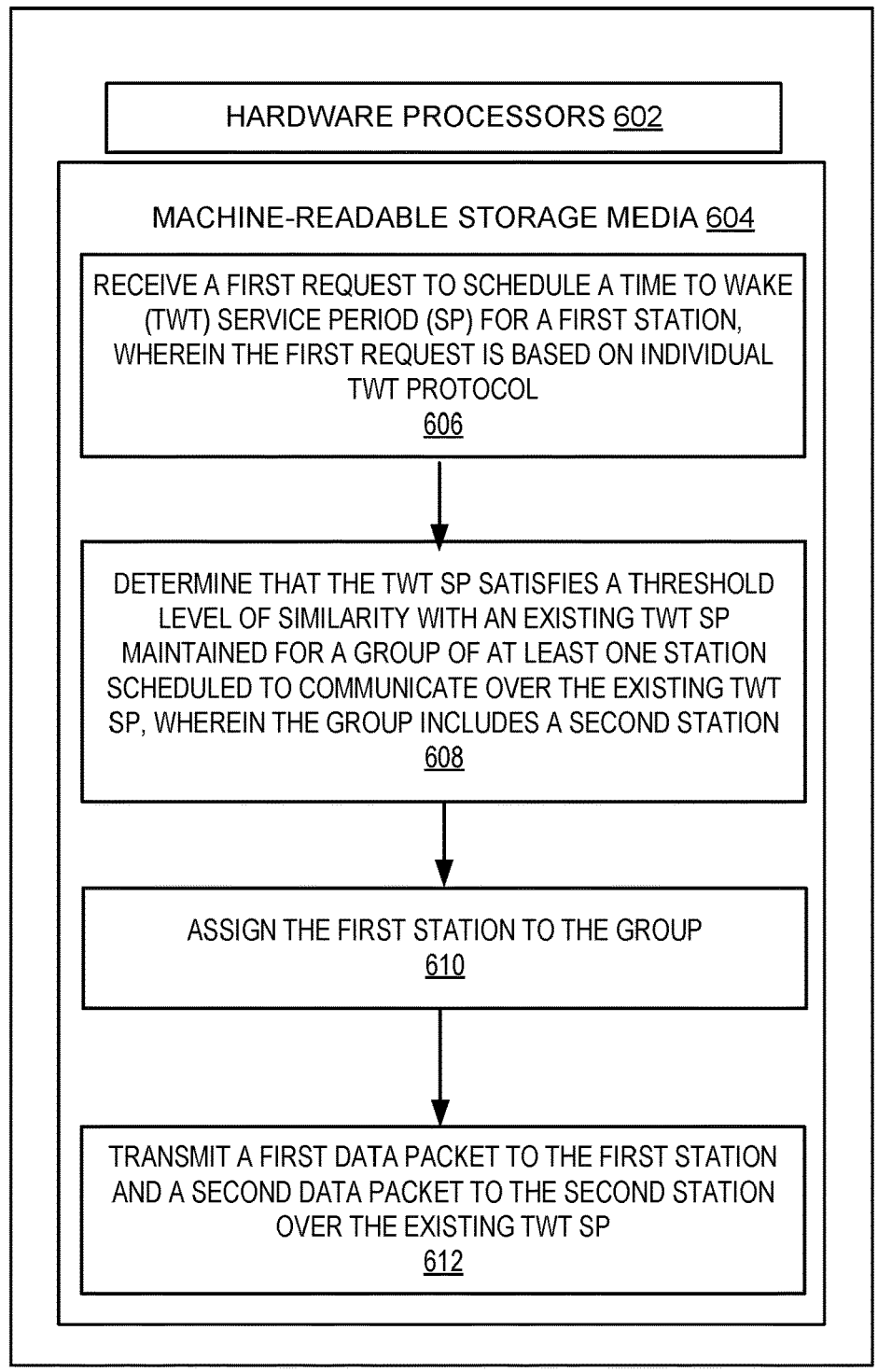
FIG. 6. depicts a set of executable instructions stored in machine-readable storage media that, when executed, cause one or more hardware processors to optimized service period negotiations, according to embodiments of the present disclosure.

FIG. 6. depicts a set of executable instructions 600 stored in machine-readable storage media that, when executed, cause one or more hardware processors to optimized service period negotiations, according to embodiments of the present disclosure. The computing component 600 may be, for example, the computing system 700 depicted in FIG. 7 or another computing device described herein. The hardware processors 602 may include, for example, the processor(s) 704 depicted in FIG. 7 or any other processing unit described herein. The machine-readable storage media 604 may include the main memory 706, the read-only memory (ROM) 708, the storage 710, or any other suitable machine-readable storage media described herein.

At block 606, in example embodiments, instructions may be executed by the hardware processors 602 to receive a first request to schedule a Time To Wake (TWT) service period (SP) for a first station. The first request is based on individual TWT protocol.

At block 608, in example embodiments, instructions may be executed by the hardware processors 602 to determine that the TWT SP can satisfy a threshold level of similarity with an existing TWT SP maintained for a group of at least one station scheduled to communicate over the existing TWT SP. The group can include a second station.

At block 610, in example embodiments, instructions may be executed by the hardware processors 602 to assign the first station to the group.

At block 612, in example embodiments, instructions may be executed by the hardware processors 602 to transmit a first data packet to the first station and a second data packet to the second station over the existing TWT SP.

Figure 7:
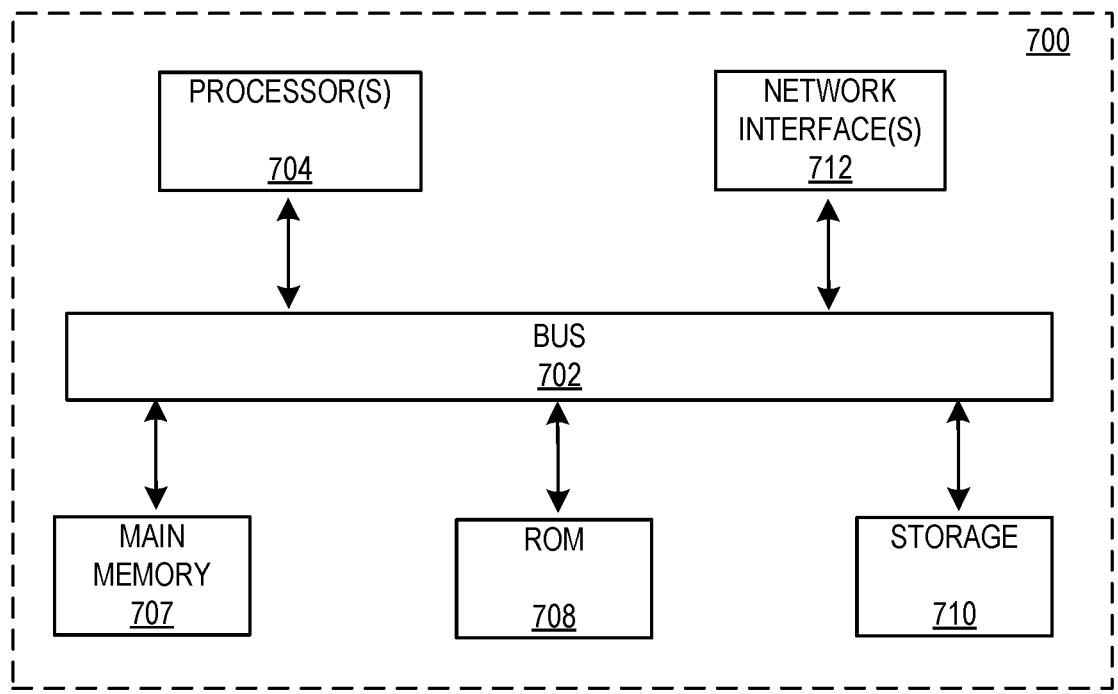
FIG. 7 illustrates an example computing component in which various embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may further include at least one network interface 712, such as a network interface controller (NIC), network adapter, or the like, or a combination thereof, coupled to bus 702 for connecting computer system 700 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
receiving, by a computing system, a first request to schedule a Time To Wake (TWT) service period (SP) for a first station, wherein the first request is based on individual TWT protocol;
determining, by the computing system, that the TWT SP satisfies a threshold level of similarity with an existing TWT SP maintained for a group of at least one station scheduled to communicate over the existing TWT SP, wherein the group includes a second station;
assigning, by the computing system, the first station to the group; and
transmitting, by the computing system, a first packet to the first station and a second packet to the second station over the existing TWT SP.

2. The computer-implemented method of claim 1, further comprising:
generating, by the computing system, a map of a plurality of groups that includes the group, wherein the map maintains assignments of stations to each group of the plurality of groups based on corresponding TWT SPs of the stations.

3. The computer-implemented method of claim 1, further comprising:
generating, by the computing system, a plurality of template predefined TWT SPs;
receiving, by the computing system, a second request to schedule a second TWT SP for the second station;
determining, by the computing system, whether a template predefined TWT SP satisfies the threshold level of similarity with the second TWT SP; and
assigning, by the computing system, the second station to the group scheduled to communicate over the existing TWT SP.

4. The computer-implemented method of claim 1, further comprising:
determining, by the computing system, that a template predefined TWT SP does not satisfy the threshold level of similarity with the second TWT SP; and
transmitting, by the computing system, at least one packet indicative of a second template predefined TWT SP to the second station.

5. The computer-implemented method of claim 4, further comprising:
receiving, by the computing system, at least one session parameter that match the second template predefined TWT SP from the second station.

6. The computer-implemented method of claim 4, further comprising:
modifying, by the computing system, the template predefined TWT SP to have the threshold level of similarity with the second TWT SP.

7. The computer-implemented method of claim 1, further comprising:
receiving, by the computing system, a second request to schedule a second TWT SP for the second station;
in response to receiving the second request, generating, by the computing system, a template TWT SP based on the second TWT SP; and
assigning, by the computing system, the second station to communicate over the template TWT SP.

8. The computer-implemented method of claim 7, further comprising:
determining, by the computing system, that the first station has a device type that is the same as the second station,
wherein the assigning the first station to the group is based on a determination that the first station and the second station are of the device type.

9. The computer-implemented method of claim 1, further comprising:
receiving, by the computing system, a second request to schedule a second TWT SP for a third station;
determining, by the computing system, that the existing TWT SP is filled over a threshold percentage level with packets from the group of the at least one station scheduled to communicate over the existing TWT SP;
generating, by the computing system, a template TWT SP based on the second TWT SP; and
assigning, by the computing system, the third station to communicate over the template TWT SP.

10. The computer-implemented method of claim 1, further comprising:
generating, by the computing system, a first template having a first periodicity;
receiving, by the computing system, a second request to schedule a third station with a TWT wake interval parameter associated with the third station; and
assigning, by the computing system, the third station to the first template based on a determination that the TWT wake interval parameter satisfies a threshold similarity with the first periodicity.

11. The computer-implemented method of claim 10, further comprising:
aligning, by the computing system, a start time of a first SP associated with the third station and a start time of a second SP associated with a fourth station assigned to the first template.

12. The computer-implemented method of claim 11, further comprising:
gaining, by the computing system, access to a communication medium over which to transmit packets to the third station and the fourth station; and
transmitting, by the computing system, a third packet to the third station before a fourth packet to the fourth station based on a determination that the first SP is shorter than the second SP.

13. The computer-implemented method of claim 10, further comprising:
receiving, by the computing system, a third request to schedule a fourth station with a TWT wake interval parameter associated with the fourth station; and
generating, by the computing system, a second template having a second periodicity based on a determination that the TWT wake interval parameter associated with the fourth station does not satisfy the threshold similarity with the first periodicity.

14. The computer-implemented method of claim 1, further comprising:
receiving, by the computing system, a second request to schedule a second TWT SP for a second station, wherein operation of the second station is limited to a particular frequency band;
determining, by the computing system, that operation of the first station is limited to the particular frequency band and that the first station is already assigned to the group associated with the existing TWT SP; and
assigning, by the computing system, the second station to a second group other than the group associated with the existing TWT SP, wherein the second group is associated with a TWT SP different from the existing TWT.

15. A system comprising:
at least one processor; and
a memory storing instructions that, when executed by the at least one processor, cause the system to perform a method comprising:
receiving a first request to schedule a Time To Wake (TWT) service period (SP) for a first station, wherein the first request is based on individual TWT protocol;
determining that the TWT SP satisfies a threshold level of similarity with an existing TWT SP maintained for a group of at least one station scheduled to communicate over the existing TWT SP, wherein the group includes a second station;
assigning the first station to the group; and
transmitting a first packet to the first station and a second packet to the second station over the existing TWT SP.

16. The system of claim 15, wherein the instructions cause the system to perform the method further comprising:
generating a plurality of template predefined TWT SPs;
receiving a second request to schedule a second TWT SP for the second station;
determining whether a template predefined TWT SP satisfies the threshold level of similarity with the second TWT SP; and
assigning the second station to the group scheduled to communicate over the existing TWT SP.

17. The system of claim 15, wherein the instructions cause the system to perform the method further comprising:
determining that a template predefined TWT SP does not satisfy the threshold level of similarity with the second TWT SP; and
transmitting at least one packet indicative of a second template predefined TWT SP to the second station.

18. A non-transitory computer-readable storage medium including instructions that, when executed by at least one processor of a computing system, cause the computing system to perform a method comprising:
receiving a first request to schedule a Time To Wake (TWT) service period (SP) for a first station, wherein the first request is based on individual TWT protocol;
determining that the TWT SP satisfies a threshold level of similarity with an existing TWT SP maintained for a group of at least one station scheduled to communicate over the existing TWT SP, wherein the group includes a second station;
assigning the first station to the group; and
transmitting a first packet to the first station and a second packet to the second station over the existing TWT SP.

19. The non-transitory computer-readable storage medium of claim 18, wherein the instructions cause the computer system to perform the method further comprising:
generating a plurality of template predefined TWT SPs;
receiving a second request to schedule a second TWT SP for the second station;
determining whether a template predefined TWT SP satisfies the threshold level of similarity with the second TWT SP; and
assigning the second station to the group scheduled to communicate over the existing TWT SP.

20. The non-transitory computer-readable storage medium of claim 18, wherein the instructions cause the computer system to perform the method further comprising:
determining that a template predefined TWT SP does not satisfy the threshold level of similarity with the second TWT SP; and
transmitting at least one packet indicative of a second template predefined TWT SP to the second station.

* * * * *